(12) United States Patent
Maus et al.

(10) Patent No.: US 7,757,483 B2
(45) Date of Patent: Jul. 20, 2010

(54) DEVICE FOR REDUCING PARTICLES OF AN EXHAUST GAS, EXHAUST GAS PURIFICATION SYSTEM AND VEHICLE HAVING THE DEVICE OR THE SYSTEM

(75) Inventors: Wolfgang Maus, Bergisch Gladbach (DE); Rolf Brück, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 440 days.

(21) Appl. No.: 11/803,373

(22) Filed: May 14, 2007

(65) Prior Publication Data
US 2007/0234714 A1 Oct. 11, 2007

Related U.S. Application Data

(63) Continuation of application No. PCT/EP2005/012111, filed on Nov. 11, 2005.

(30) Foreign Application Priority Data
Nov. 12, 2004 (DE) .................. 10 2004 054 845

(51) Int. Cl.
*F01N 3/02* (2006.01)
(52) U.S. Cl. .................. 60/311; 60/295; 60/297; 60/299; 55/521; 55/523; 55/524; 55/525; 55/DIG. 30
(58) Field of Classification Search .................. 60/297, 60/311, 295, 299; 55/521, 522, 523, 524, 55/525, DIG. 30
See application file for complete search history.

(56) References Cited

U.S. PATENT DOCUMENTS

| 7,122,612 | B2 | 10/2006 | Tao et al. |
| 7,132,150 | B2 | 11/2006 | Ogunwumi et al. |
| 2001/0006934 | A1 | 7/2001 | Kachi et al. |
| 2003/0072694 | A1 | 4/2003 | Hodgson et al. |
| 2004/0013580 | A1* | 1/2004 | Bruck et al. ................. 422/171 |
| 2004/0111685 | A1 | 6/2004 | Bowers et al. |

(Continued)

FOREIGN PATENT DOCUMENTS

DE 195 19 137 A1 12/1995

(Continued)

OTHER PUBLICATIONS

English translation of Chinese Office Action dated Feb. 6, 2009.

(Continued)

*Primary Examiner*—Binh Q Tran
(74) *Attorney, Agent, or Firm*—Laurence A. Greenberg; Werner H. Stemer; Ralph E. Locher

(57) ABSTRACT

A device for reducing particles of an exhaust gas includes at least one carrier structure having a predefinable volume and a plurality of channels which can be traversed by a flow. The channels at least partially have measures for deflecting the exhaust gas within the channels. The at least one carrier structure at least partially has a first coating including a washcoat. A quantity of the washcoat in a range of from 10 to 60 grams is provided per liter of the volume, provided with the first coating, of the carrier structure. An exhaust gas purification system and a vehicle having the device or the system, are also provided.

12 Claims, 4 Drawing Sheets

U.S. PATENT DOCUMENTS

| | | |
|---|---|---|
| 2005/0037147 A1 | 2/2005 | Ogunwumi et al. |
| 2005/0191480 A1 | 9/2005 | Tao et al. |
| 2005/0232830 A1* | 10/2005 | Bruck .................. 422/180 |
| 2005/0274012 A1 | 12/2005 | Hodgson et al. |
| 2006/0270816 A1 | 11/2006 | Tao et al. |
| 2007/0006556 A1 | 1/2007 | Bruck et al. |
| 2008/0250775 A1 | 10/2008 | Bruck |

FOREIGN PATENT DOCUMENTS

| | | |
|---|---|---|
| DE | 100 20 170 C1 | 9/2001 |
| DE | 102 35 766 A1 | 2/2004 |
| DE | 102 57 113 A1 | 6/2004 |
| DE | 10 2004 001 417 A1 | 8/2004 |
| WO | 2004/050219 A1 | 6/2004 |
| WO | WO 2004050219 A1 * | 6/2004 |
| WO | WO 2004/072446 A1 | 8/2004 |
| WO | WO 2005/018790 A2 | 3/2005 |
| WO | WO 2005/091821 A2 | 10/2005 |
| WO | WO 2005/099867 A1 | 10/2005 |

OTHER PUBLICATIONS (Author not named), "Der Metallkatalysator als variables System", dated Oct. 2004, pp. 798-803.

* cited by examiner

DEVICE FOR REDUCING PARTICLES OF AN EXHAUST GAS, EXHAUST GAS PURIFICATION SYSTEM AND VEHICLE HAVING THE DEVICE OR THE SYSTEM

CROSS-REFERENCE TO RELATED APPLICATIONS

This is a continuation, under 35 U.S.C. §120, of copending International Application No. PCT/EP2005/012111, filed Nov. 11, 2005, which designated the United States; this application also claims the priority, under 35 U.S.C. §119, of German Patent Application DE 10 2004 054 845.5, filed Nov. 12, 2004; the prior applications are herewith incorporated by reference in their entirety.

BACKGROUND OF THE INVENTION

Field of the Invention

The present invention relates to a device for reducing particles of an exhaust gas, including at least one carrier structure with a predefinable volume. The carrier structure forms a plurality of channels which can be traversed by a flow. The channels at least partially have measures for deflecting the exhaust gas within the channels. The at least one carrier structure is also at least partially provided with a first coating including a washcoat. Devices of that type are used in particular for purifying exhaust gases of mobile internal combustion engines. The present invention therefore also relates to an exhaust gas purification system for a mobile internal combustion engine and to a vehicle.

In known filter systems, a distinction is made between so-called "open" and "closed" systems. Closed systems have channels alternately closed off at regular intervals in order to thereby force the exhaust gas, which is to be purified, through porous channel walls. In those closed systems, however, there is the risk that regions with large accumulations of soot particles will form, which ultimately leads to blockage of the filter. A reactivation of a filter of that type can take place by burning off the soot particles, in which case it is necessary in particular to provide measures for increasing the temperature in the filter (brief electric heating, direct fuel injection, additive addition, etc.). For that reason, open systems are now often used, since they cannot become blocked and accordingly do not result in any great technical expenditure.

In open systems, there are no fully closed-off channels. At least part of the channels is, however, provided with measures for manipulating the flow in such a way that the exhaust gas or the particles contained therein do not flow straight through but are deflected towards a channel wall. For that purpose, use is for example made of projections, knobs, guide blades, channel constrictions or the like. The change in the otherwise rectilinear channel flow has the effect in particular of causing the soot particles to come into contact with the channel walls. The soot particles then accumulate on a surface of the channel wall and can then be converted, preferably with nitrogen dioxide contained in the exhaust gas.

It is accordingly of particular significance in open systems to provide a sufficient quantity of nitrogen dioxide ($NO_2$) in order to ensure particularly high conversion rates of the soot or particles which occur. As one possibility, it is known to connect a particle trap of that type upstream of a so-called oxidation catalytic converter which, in a first stage, oxidizes the nitrogen monoxide (NO) contained in the exhaust gas and thereby increases the nitrogen dioxide content in the exhaust gas. The exhaust gas flow which is enriched with nitrogen dioxide then impinges on the filter. That combination of an oxidation catalytic converter which is connected upstream and a particle separator is often referred to as a CRT ("continuous regeneration trap") as is described, for example, in European Patent EP 0 341 832 B1, corresponding to U.S. Pat. No. 4,902,487.

Proceeding from European Patent EP 0 341 832 B1, corresponding to U.S. Pat. No. 4,902,487, there have been many endeavors to further develop the components in such a way as to increase the efficiency of the open systems, in which it is fundamentally theoretically possible for a part of the exhaust gas to flow out again without having passed through a filter wall. In that case, the measures for deflecting the exhaust gas flow within the channels are of particular interest. In addition, an increasingly used approach for that purpose has been to use not only smooth walls for forming the channels but to construct the channels with fiber material and/or material which is impermeable to gas. As an example of an already highly efficient particle filter of the "open" type, reference is made to commonly assigned German Utility Model DE 2001 17 873 U1, and its counterpart U.S. patent application Ser. No. 10/289,088.

SUMMARY OF THE INVENTION

It is accordingly an object of the invention to provide a device for reducing particles of an exhaust gas, an exhaust gas purification system and a vehicle having the device or the system, which overcome the hereinafore-mentioned disadvantages of the heretofore-known devices, systems and vehicles of this general type and which are even more efficient with regard to the conversion of particles. The device should additionally have a simple construction and be easy to mass-produce, the exhaust gas purification system should be efficient and the vehicle should be environmentally friendly.

With the foregoing and other objects in view there is provided, in accordance with the invention, a device for reducing particles of an exhaust gas. The device comprises at least one carrier structure having a predefinable volume. The at least one carrier structure forms a multiplicity of channels to be traversed by an exhaust gas flow. The channels at least partially have measures for deflecting the exhaust gas within the channels. The at least one carrier structure at least partially has a first coating including a quantity of washcoat in a range of from 10 to 60 grams per liter of the predefinable volume having the first coating.

The term "carrier structure" is intended in particular to mean a type of honeycomb structure with a plurality of channels. A carrier structure of that type is, for example, disposed in a housing or casing tube, although it is also possible to provide a plurality of carrier structures of that type in one housing. The carrier structure has a predefinable volume. This refers to that volume of the carrier structure which forms the channels, wherein the channel walls and the channels themselves are to be added to that volume. The channels preferably run substantially parallel to one another and in the flow direction. The channel density is, for example, 100 to 600 cpsi ("cells per square inch", corresponding approximately to 15.5 to 93 channels per square centimeter), preferably 200 to 400 cpsi (corresponding approximately to 31 to 52 channels per square centimeter).

Measures or devices for deflecting the exhaust gas within a channel are also provided. The measures can, for example, include projections, knobs, etc. which project into the channel, guide blades, openings, impressions or the like. The measures cause a local deflection of at least part of the exhaust gas which flows through the channel. The measures preferably have the effect of permitting at least a part of the exhaust gas flow to flow into adjacent channels. For this purpose, separate flow channels can be formed from one channel to an adjacent channel, although it is, for example, also possible for that part of the exhaust gas to pass through a channel wall which is permeable to gas. This embodiment of the channels of the carrier structure is very particularly preferably a so-called open system, as has already been described in the introduction hereto.

The device described herein is a coated device for reducing particles. The first coating includes a washcoat, a porous aluminum oxide which has a particularly jagged surface. The washcoat layer serves, for example, to hold catalytically active materials and is likewise distinguished by a high adsorption capacity of (soot) particles.

It is an aim of the invention to select the first coating in such a way that a regeneration of nitrogen dioxide can take place within the device. The incoming $NO_2$-enriched exhaust gas flow comes into contact, in the conventional way, with the accumulated particles, and converts the latter (for example into carbon dioxide). The oxidation of the soot or of the particles which is provided in this way simultaneously leads, however, to the reduction of the nitrogen dioxide and to an increase in nitrogen monoxide. In this way, however, the available nitrogen dioxide would be quickly used up and would no longer be available for further conversion. A device is therefore specified herein in which the nitrogen monoxide which has already been used is oxidized again to form nitrogen dioxide, in order to be available once again for the conversion of particles in partial regions of the channels situated downstream.

This is achieved in such a way that a quantity of washcoat of from 10 to 60 grams [g] is provided per liter [l] of the volume, which is provided with the first coating, of the carrier structure. The quantity of washcoat is preferably in a range of from 20 to 40 g/l, and in particular from 25 to 35 g/l. A washcoat quantity is therefore specified which is considerably lower than the otherwise conventional quantity (for example approximately 200 g/l). The reduced washcoat quantity now has the result that the channels have a slightly larger freely traversable channel cross section, and also that a slightly less jagged channel surface is present. This has the result, for example, that the soot or the particles do not accumulate more intensely in the inlet region of the device, but rather that a reduced accumulation of the particles is obtained which is, however, distributed more uniformly over the length of the device or of the channels. This in turn has the resulting effect that a sufficient free surface of the channels is also present, which is for example doped with the catalytically active substances. This opens up the possibility that, on one hand, the exhaust gas reacts with the catalytically active coating and an oxidation of nitrogen monoxide takes place, and at another point, in turn, the oxidation of the soot or of the particles can take place. Tests have shown that it is possible in this way to obtain a reduction of particle emissions of more than 20% in relation to conventional particle filters.

In accordance with another feature of the invention, the first coating is provided with at least one noble metal, with a quantity of the at least one noble metal in a range of from 0.35 to 3.53 grams [g] being provided per liter [l] of the volume, which is provided with the first coating, of the carrier structure. This corresponds approximately to a loading of 10 to 60 grams per cubic foot [g/ft$^3$]. The noble metal used is preferably platinum. A noble metal quantity in a range of from 1.3 g/l (or 36.8 g/ft$^3$) to 1.5 g/l (or 42.5 g/ft$^3$) is particularly preferable. This quantity of noble metal has likewise proven to be particularly effective for use in the regeneration of nitrogen dioxide.

In accordance with a further feature of the invention, the at least one carrier structure has a length of at least 120 millimeters [mm] in a flow direction. Carrier structures which have a length of at least 150 mm are particularly preferable in this case.

This ensures that, despite the reduced suitability of the washcoat coating for the adsorption of soot, a sufficiently large length is available, so that nevertheless ultimately almost all of the soot particles can come into contact with a channel wall. For this purpose, the channels preferably have deflections for the exhaust gas disposed in a repeating fashion with a predefined spacing, so that the probability of contact of the soot particles and the first coating or the channel wall is increased.

In accordance with an added feature of the invention, the at least one carrier structure at least partially includes structured metal foils. The carrier structure is advantageously formed with a plurality of alternately disposed smooth and corrugated metal foils. The metal foils are wound or intertwined with one another to form a honeycomb body. A honeycomb body of this type is inserted into a housing and at least partially brazed. With regard to the embodiment of the corrugated metal foil, reference is to be made in particular to German Utility Model DE 20 17 873 U1 as specified in the introduction hereto, the content of which is hereby included in its entirety in the subject matter of the description of the instant application.

In accordance with an additional feature of the invention, the at least one carrier structure at least partially includes metal foils with perforations. Perforations of this type can be provided in a section of a corrugated metal foil and/or of a smooth metal foil. In this case, the perforations are preferably formed with a diameter in a range of from 3 mm to 10 mm, preferably 3 mm to 8 mm. With regard to production, the perforations are formed in lines, rows or a similar pattern. It is also possible for microstructures to be at least partially provided between the perforations, as a function of the cell density in a range of from 0.5 mm to 2 mm, having a height which is in a range of up to 1 mm. In accordance with yet another feature of the invention, the at least one carrier structure includes at least one filter layer. Metallic fibers preferably considered for a filter insert. Fibrous (at least partially metallic) nonwovens of that type can also be used in a composite with metal foils. The composite is preferably provided by welding the fiber layer to at least one section of a metal foil. In this case, the first coating can be provided both on or in the filter layer and (or if appropriate only) on the metal foil.

In accordance with yet a further feature of the invention, the at least one carrier structure has at least one first partial region with a first coating and at least one second partial region with a second coating. In this case, the two partial regions of the carrier structure preferably have a different construction. It is, for example, proposed in particular that the washcoat quantity specified according to the invention be provided in only one of the two partial regions, preferably in the partial region situated downstream. In some circumstances, however, it is also possible for both the first coating as well as the second coating to have the same washcoat quantity, but with the coatings differing in concentration or in the type of catalytically active substances.

In accordance with yet an added feature of the invention, the at least one carrier structure has at least one first partial region and at least one second partial region, at least one of which has a coating. It is, for example, advantageously possible according to the invention for a carrier structure to be formed in which the first partial region has a coating while the second partial region is uncoated, or vice versa.

In accordance with yet an additional feature of the invention, the at least one carrier structure has at least one first partial region with at least one filter layer and at least one filterless second partial region. The at least one first partial region is disposed downstream of the at least one second partial region in the flow direction. An embodiment is very particularly preferable in this case in which only differently constructed metal foils, for example one corrugated metal foil with measures or devices for deflecting the exhaust gas flow, and one smooth metal foil with perforations, are provided in the at least one filterless second partial region. It is also preferable in this context for the filterless second partial region to have no measures or devices for deflecting the exhaust gas.

With the objects of the invention in view, there is also provided an exhaust gas purification system for a mobile internal combustion engine. The system comprises at least one converter at least for oxidizing nitrogen monoxide contained in the exhaust gas to form nitrogen dioxide. At least one device according to the invention is disposed downstream of the at least one converter in a flow direction of the exhaust gas.

A so-called "CRT" system is therefore now described herein, with the device according to the invention for reducing particles having been integrated therein. The converter can be positioned directly upstream of (and if appropriate also in contact with) the device. It is however also possible for a gap or a larger passage of the exhaust line to be provided between the two components.

In accordance with another feature of the invention, the exhaust gas purification system is constructed with a turbocharger. A converter is disposed between the internal combustion engine and the turbocharger. The first converter is thereby positioned in the immediate vicinity of the internal combustion engine and reaches its light-off temperature (approximately 200° C.) directly after the internal combustion engine is started. In this way, the converter already ensures the presence of sufficient nitrogen dioxide at an early stage for converting the soot particles which are collected downstream. In this case, the turbocharger serves as a type of flow mixer, so as to permit a uniform distribution of nitrogen dioxide in the exhaust gas flow.

With the objects of the invention in view, there is concomitantly provided a vehicle, comprising at least one device according to the invention or at least one exhaust gas purification system according to the invention.

Other features which are considered as characteristic for the invention are set forth in the appended claims.

Although the invention is illustrated and described herein as embodied in a device for reducing particles of an exhaust gas, an exhaust gas purification system and a vehicle having the device or the system, it is nevertheless not intended to be limited to the details shown, since various modifications and structural changes may be made therein without departing from the spirit of the invention and within the scope and range of equivalents of the claims.

It is noted that the features listed individually in the claims can be combined with one another in any desired technologically expedient way and highlight further advantageous embodiments of the invention. Further embodiments can be gathered from the description.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
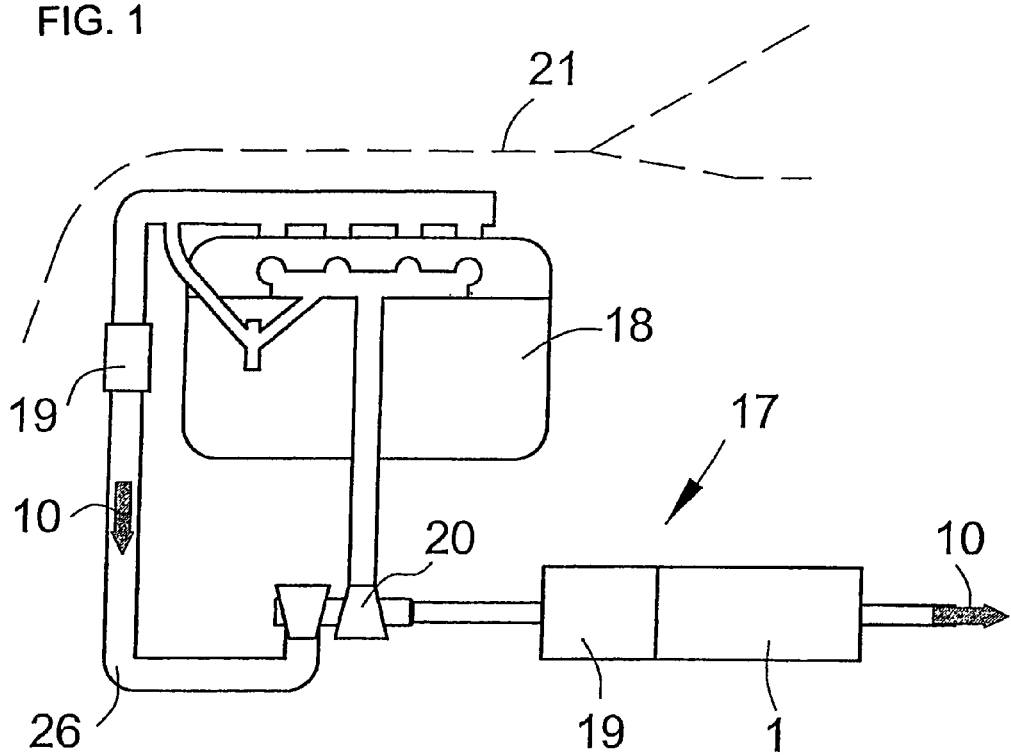
FIG. 1 is a diagrammatic, top-plan view of an embodiment of an exhaust gas purification system of a vehicle.

Reference will now be made in detail to the figures of the drawings, on the basis of which the invention and its technical field will be explained in more detail. It is noted that the figures show particularly preferred exemplary embodiments of the invention, to which the invention, however, is not restricted. In addition, the figures are diagrammatic illustrations which are often unsuitable for illustrating proportions. Referring first, particularly, to FIG. 1, there is seen a broken line indicating a vehicle 21 which has an exhaust gas purification system 17. Exhaust gas proceeding from an internal combustion engine 18 flows through an exhaust line 26 firstly to a converter 19 which is disposed in the immediate vicinity of the internal combustion engine 18. The converter 19 serves to oxidize nitrogen monoxide which is contained in the exhaust gas to form nitrogen dioxide, and thereby enriches the exhaust gas flow with nitrogen dioxide even directly after the internal combustion engine 18 is started. The exhaust gas then flows further in a flow direction 10 to a turbocharger 20. The exhaust gas flowing through the turbocharger 20 is swirled, so as to provide a uniform distribution of nitrogen dioxide. The exhaust gas then impinges on a second catalytic converter 19 which, for example, produces further nitrogen dioxide. The $NO_2$-enriched exhaust gas then flows through a device 1 for reducing particles. The exhaust gas which has been purified of (soot) particles leaves the exhaust gas purification system 17 in the flow direction 10.

Figure 2:
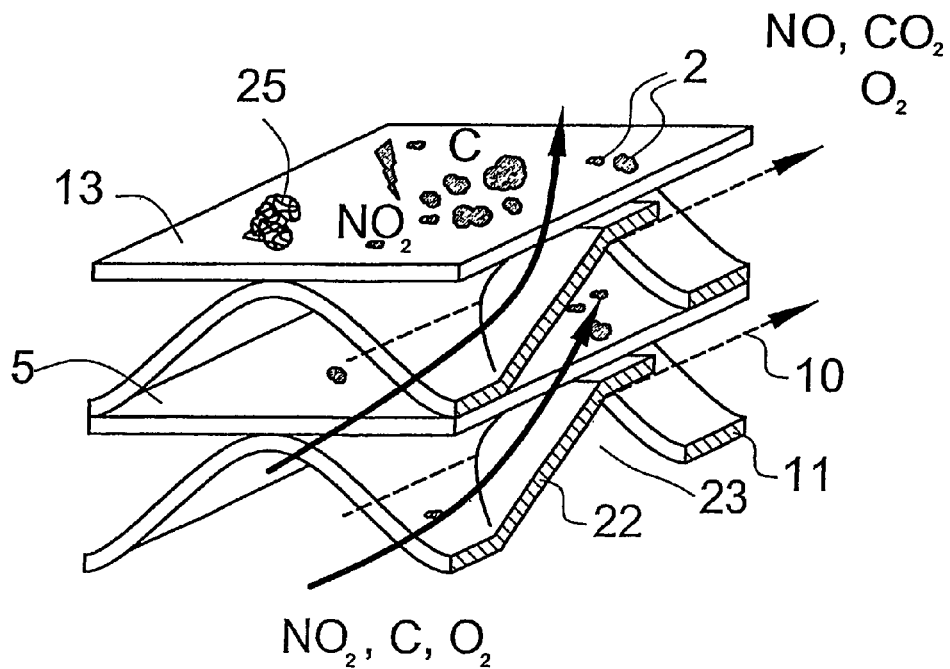
FIG. 2 is a fragmentary, perspective view of a carrier structure having channels.

FIG. 2 illustrates chemical conversion processes within the device 1. The device 1 is formed in this case with an alternating configuration of corrugated metal foils 11 and smooth filter layers 13. The corrugated structure of the metal foils 11 forms channels 5. The channels 5 are thereby enclosed partially by the filter layer 13 and the metal foil 11. Projections 22 which are formed in the metal foil 11 cause a deflection of the exhaust gas towards a channel wall or the filter layer 13. The projections 22 are formed in this case as punched-out portions, so that openings 23 are provided in the metal foil 11 and communicating channels 5 are thereby formed, in which a part of the exhaust gas flow can flow from one channel 5 to an adjacent channel 5 (and preferably at the same time by passing through a fiber layer 13).

The exhaust gas flowing in includes at least nitrogen dioxide ($NO_2$), particles 2 or carbon-containing components (C) and oxygen ($O_2$). As a result of the partial deflection of the exhaust gas flow, the particles 2 accumulate on the channel walls and in particular on or in the fiber layer 13. An increased residence time of the particles 2 on the channel walls increases a possibility of the particles coming into contact with the nitrogen dioxide and therefore of a chemical conversion of the soot particles taking place. In this case, a filter layer 13 which is formed from metallic fibers 25 has proven to be particularly efficient. The filter layer 13 has a jagged surface and a plurality of cavities, so that the particles 2 can accumulate effectively in this case. On one hand, a reduction of nitrogen dioxide to form nitrogen monoxide (NO) and, on the other hand, an oxidation of the carbon to form carbon oxide compounds ($CO$, $CO_2$), take place during the conversion of the particles 2. The exhaust gas flowing out therefore has a higher proportion of nitrogen monoxide and carbon dioxide.

Figure 3:
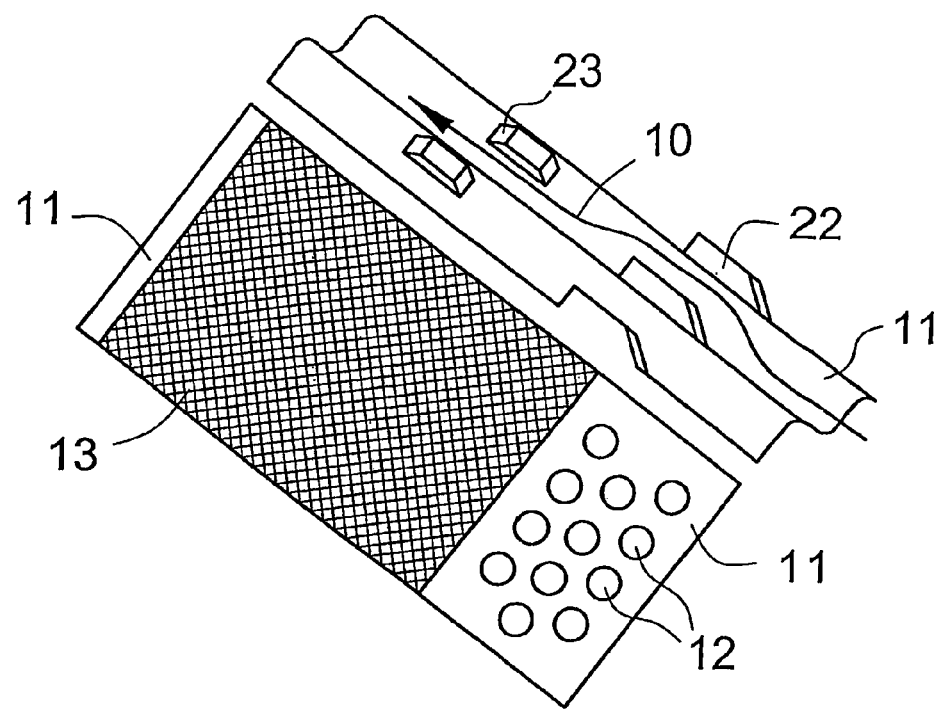
FIG. 3 is a perspective view showing a structure of another embodiment of the device.

FIG. 3 illustrates components of a further exemplary embodiment of a device 1 for reducing particles 2. For this purpose, two different components (if appropriate disposed with multiple repetition and disposed in a stack) are used to form channels 5. A corrugated metal foil 11 is illustrated in the upper part of FIG. 3. In this case, the corrugation decisively determines the structure of the channels 5. In addition to the corrugation, the metal foil 11 has different projections 22 and openings 23. The flow direction 10 of one partial exhaust gas flow is illustrated in this case by way of example. With respect to the projection 22, on which the exhaust gas flow initially impinges, a part of the exhaust gas flow is deflected upward, in particular toward an adjacently disposed filter layer 13. Another partial gas flow, however, flows past the projection 22 and remains in the channel 5. This partial gas flow then impinges on an inversely formed type of projection 22, with it being possible for a renewed division of the exhaust gas flow to take place, for example as a result of different pressure conditions within the channels 5. A part thereby passes through the opening 23 into the adjacent channel 5, while the rest of the exhaust gas flow flows further along the channel 5.

The filter layer 13 is embodied as a composite in this case. The filter material (illustrated in this case by hatched lines) is delimited in the flow direction in each case by a smooth metal foil 11 or a metal strip. As is illustrated at the top left of FIG. 3 (preferably the exhaust gas outlet side of the device 1), a narrow metal strip is provided which is preferably bent around the fiber layer 13 and welded thereto. This prevents the filter layer 13, which is for example embodied as a metallic fibrous nonwoven, from disintegrating as a result of thermal and dynamic loading. A relatively wide metal strip is provided at the bottom right of the illustration (preferably the exhaust gas inlet side). This metal strip is preferably fastened to the filter layer 13 in a similar way to the other metal strip. This wide metal strip is embodied as a catalyst carrier surface and/or as a mixer for the exhaust gas flowing in. For this purpose, the wide metal strip also has a plurality of perforations 12. At least a part of the perforations 12 is preferably provided with a larger diameter than the largest channel cross section of the channel situated above it.

Figure 4:
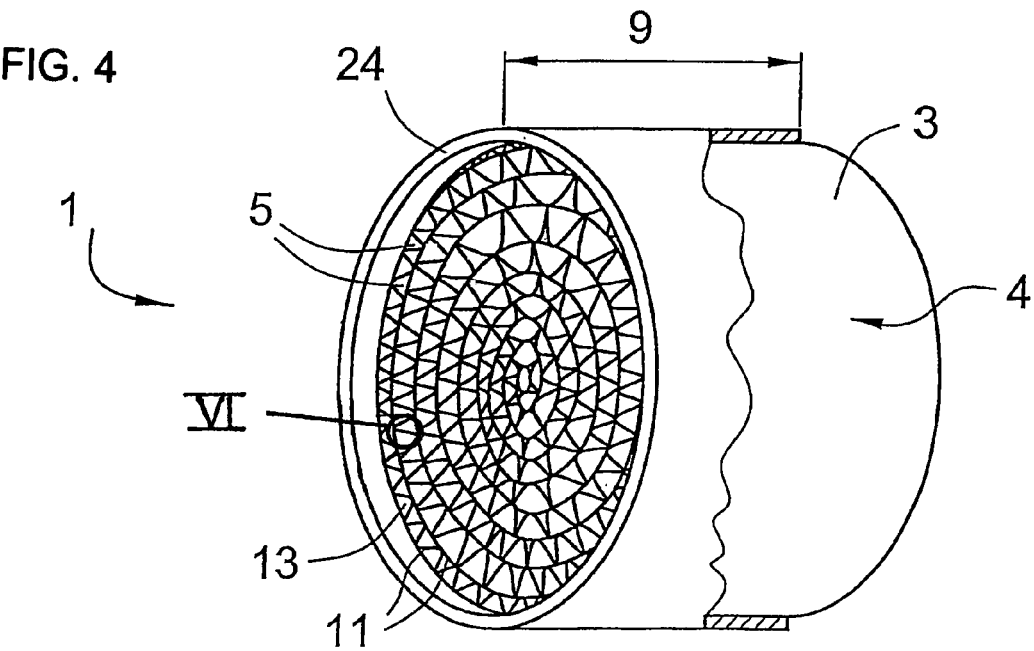
FIG. 4 is a partly broken-away perspective view of a further embodiment of the device for particle separation.
Figure 6:
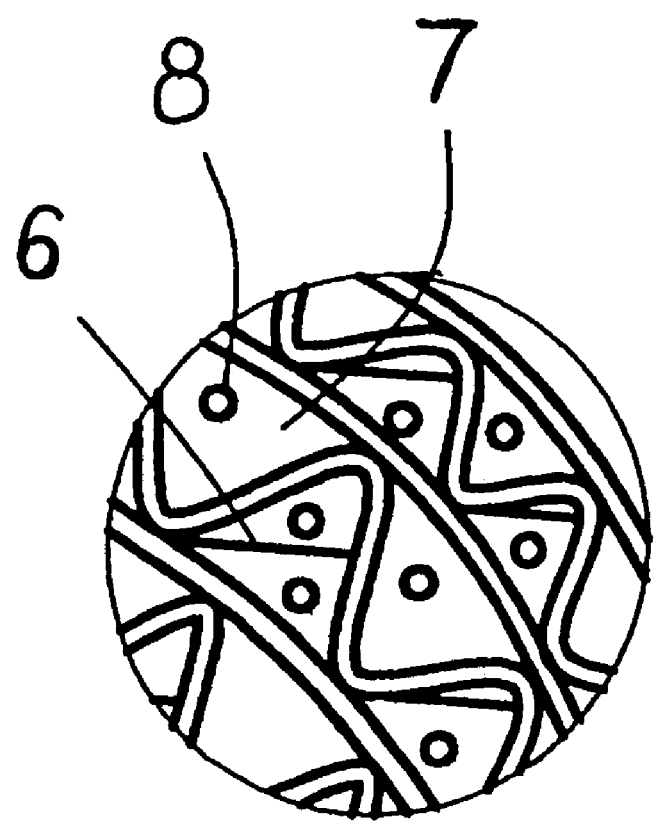
FIG. 6 is an enlarged perspective view of a portion VI of FIG. 4.

FIGS. 4 and 6 diagrammatically show an embodiment of the device 1, with FIG. 6 substantially showing an enlarged illustration of that region of FIG. 4 which is denoted by reference numeral VI. A carrier structure 3 is provided in this case with a spirally-wound metal foil 11 and a filter layer 13. The corrugation of the metal foil 11 in turn serves to form a plurality of channels 5 which can be traversed by a flow. The carrier structure 3 has a predefined volume 4 and is disposed in a housing 24 which preferably has a cylindrical construction. Other cross-sectional shapes of the device 1 can likewise be provided. The carrier structure 3 is configured to have a length 9 of at least 150 mm.

It can be seen from the portion VI at the bottom left of the carrier structure 3 of FIG. 4, which is shown in an enlarged illustration in FIG. 6, that the carrier structure 3 has a first coating 6. The first coating 6 includes a washcoat 7 in a quantity of approximately 10 to 60 g/l of the carrier structure 3, and noble metals 8 in a quantity of approximately 0.35 to 3.53 g/l.

Figure 5:
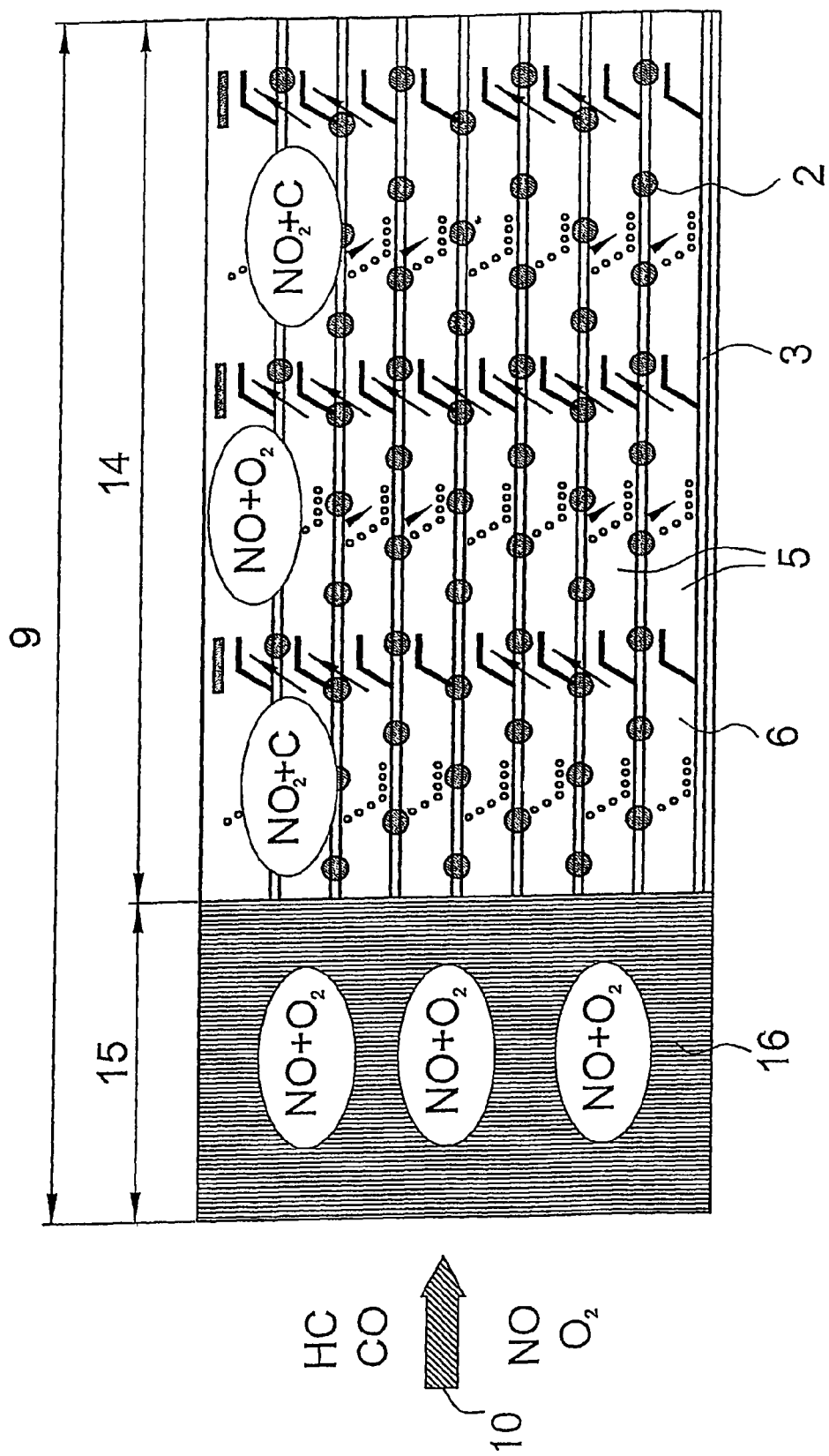
FIG. 5 is a cross-sectional view illustrating reaction processes in a further exemplary embodiment of the device according to the invention.

FIG. 5 diagrammatically shows a cross section through a device 1 for reducing particles 2. The device 1 includes a carrier structure 3 having a plurality of channels 5 which can be traversed by a flow. The device 1 illustrated in this case is constructed to have two partial regions. As viewed in the flow direction 10, the device 1 initially has a second partial region 15 with a second coating 16. The second coating 16 oxidizes the nitrogen monoxide which is contained in the exhaust gas to form nitrogen dioxide. The second partial region 15 is then directly adjoined by a first partial region 14 with the first coating 6. Due to the composition of the first coating 6 described according to the invention, the nitrogen dioxide formed in the second partial region 15 serves to convert the particles 2, so that a reduction takes place to form nitrogen monoxide. Downstream thereof, however, but still within the device 1, renewed oxidization of the nitrogen monoxides is possible due to the first coating 6. The newly formed nitrogen dioxide can then be used again in the device 1 to convert the particles 2. In the embodiment shown in this case, the first partial region 14 and the second partial region 15 are disposed within one carrier structure 3 which again has a predefinable length 9. It is, however, fundamentally also possible to provide a gap between the second partial region 15 and the first partial region 14, with two carrier structures, or one converter and one carrier structure, preferably then being provided.

A reclamation of nitrogen dioxide, and therefore considerably more efficient conversion of particles contained in the exhaust gas, is made possible by the device for reducing particles proposed herein.

We claim:

1. A device for reducing particles of an exhaust gas, the device comprising:

at least one carrier structure having a predefinable volume;

said at least one carrier structure having a multiplicity of channels to be traversed by an exhaust gas flow flowing in a flow direction, said channels having deflections for the exhaust gas disposed in a repeating fashion with a predefined spacing, said channels at least partially deflecting the exhaust gas within said channels and said at least one carrier structure having at least one filter layer with a filter material, said filter material being delimited in the flow direction by a metal strip having a plurality of perforations formed therein; and said at least one carrier structure having a length of at least 120 mm in the flow direction and at least partially having a first coating including a quantity of washcoat in a range of from 10 to 60 grams per liter of said predefinable volume having said first coating.

2. The device according to claim 1, wherein said first coating has a quantity of at least one noble metal in a range of from 0.35 to 3.53 grams per liter of said predefinable volume having said first coating.

3. The device according to claim 1, wherein said at least one carrier structure at least partially includes structured metal foils.

4. The device according to claim 1, wherein said at least one carrier structure at least partially includes metal foils with perforations.

5. The device according to claim 1, wherein said at least one carrier structure has at least one first partial region and at least one second partial region, at least one of said partial regions having a coating.

6. The device according to claim 1, wherein said at least one carrier structure has at least one first partial region with said first coating and at least one second partial region with a second coating.

7. The device according to claim 1, wherein said at least one carrier structure has at least one first partial region with at least one filter layer and at least one filterless second partial region, said at least one first partial region being disposed downstream of said at least one second partial region in a flow direction.

8. The device according to claim 1, which further comprises a device for at least partially deflecting the exhaust gas within said channels.

9. An exhaust gas purification system for a mobile internal combustion engine, the system comprising:

at least one converter at least for oxidizing nitrogen monoxide contained in the exhaust gas to form nitrogen dioxide; and at least one device according to claim 1 disposed downstream of said at least one converter in a flow direction of the exhaust gas.

10. The exhaust gas purification system according to claim 9, which further comprises a turbocharger, said converter being disposed between the internal combustion engine and said turbocharger.

11. A vehicle, comprising at least one device according to claim 1.

12. A vehicle, comprising at least one exhaust gas purification system according to claim 9.

* * * * *